United States Patent [19]

Tracy et al.

[11] 4,194,708

[45] Mar. 25, 1980

[54] REMOTELY PILOTED VEHICLE

[75] Inventors: Daniel J. Tracy, Maple Valley; John P. Palmer, Seattle; Daniel J. O'Brien, Kirkland, all of Wash.

[73] Assignee: The United States of America as represented by the Secretray of the Air Force, Washington, D.C.

[21] Appl. No.: 944,441

[22] Filed: Sep. 21, 1978

[51] Int. Cl.² .......................... B64C 15/02; B64D 1/06
[52] U.S. Cl. ..................................... 244/15; 89/1.5 R; 244/45 A; 244/100 A; 244/133; 244/135 R; 244/137 R
[58] Field of Search ............. 244/15, 13, 45 A, 135 R, 244/135 C, 118 R, 119, 133, 137 R, 100 A, 100 R, 14, 89, 90 R, 123; 89/1 A, 1.5 R, 1.5 E

[56] References Cited

U.S. PATENT DOCUMENTS

| 2,644,777 | 7/1953 | Havens | 244/119 X |
|---|---|---|---|
| 2,660,383 | 11/1953 | Feeney et al. | 244/90 R X |
| 2,823,880 | 2/1958 | Bergeson | 244/135 C |
| 2,967,677 | 1/1961 | Winzen et al. | 244/2 |
| 2,982,501 | 5/1961 | Griffith et al. | 244/135 R X |
| 3,009,669 | 11/1961 | Locke | 244/119 X |
| 3,305,196 | 2/1967 | Hanlon | 244/123 |
| 3,362,659 | 1/1968 | Razak | 244/45 A |
| 3,869,103 | 3/1975 | Nelson et al. | 244/100 R |
| 3,964,698 | 6/1976 | Earl | 244/100 A |
| 4,093,156 | 6/1978 | Coe | 244/45 A |

FOREIGN PATENT DOCUMENTS 1506122 10/1969 Fed. Rep. of Germany ...... 244/137 R

OTHER PUBLICATIONS

O'Brian et al., "U.S./F.R.G. Advanced Tactical RPV Requirements As Analyzed by Boeing and Dornier", 4th Annual Symposium of the National Association of Remotely Piloted Vehicles, 6/1977, FIGS. 10 & 14.

*Primary Examiner*—Barry L. Kelmachter
*Attorney, Agent, or Firm*—Joseph E. Rusz; Arsen Tashjian

[57] ABSTRACT

A recoverable remotely piloted vehicle (RPV) having: a deflectable canard/elevator placed very close to the nose tip; a constant (cross) section fuselage; wings mounted low and well aft on the fuselage; elevons; a centrally positioned weapons/payload bay, with doors, located internal of the upper portion of the fuselage; and, inflatable landing skids. The weapon/payload is dropped from the RVP, while the RVP is in flight in an inverted position.

4 Claims, 5 Drawing Figures

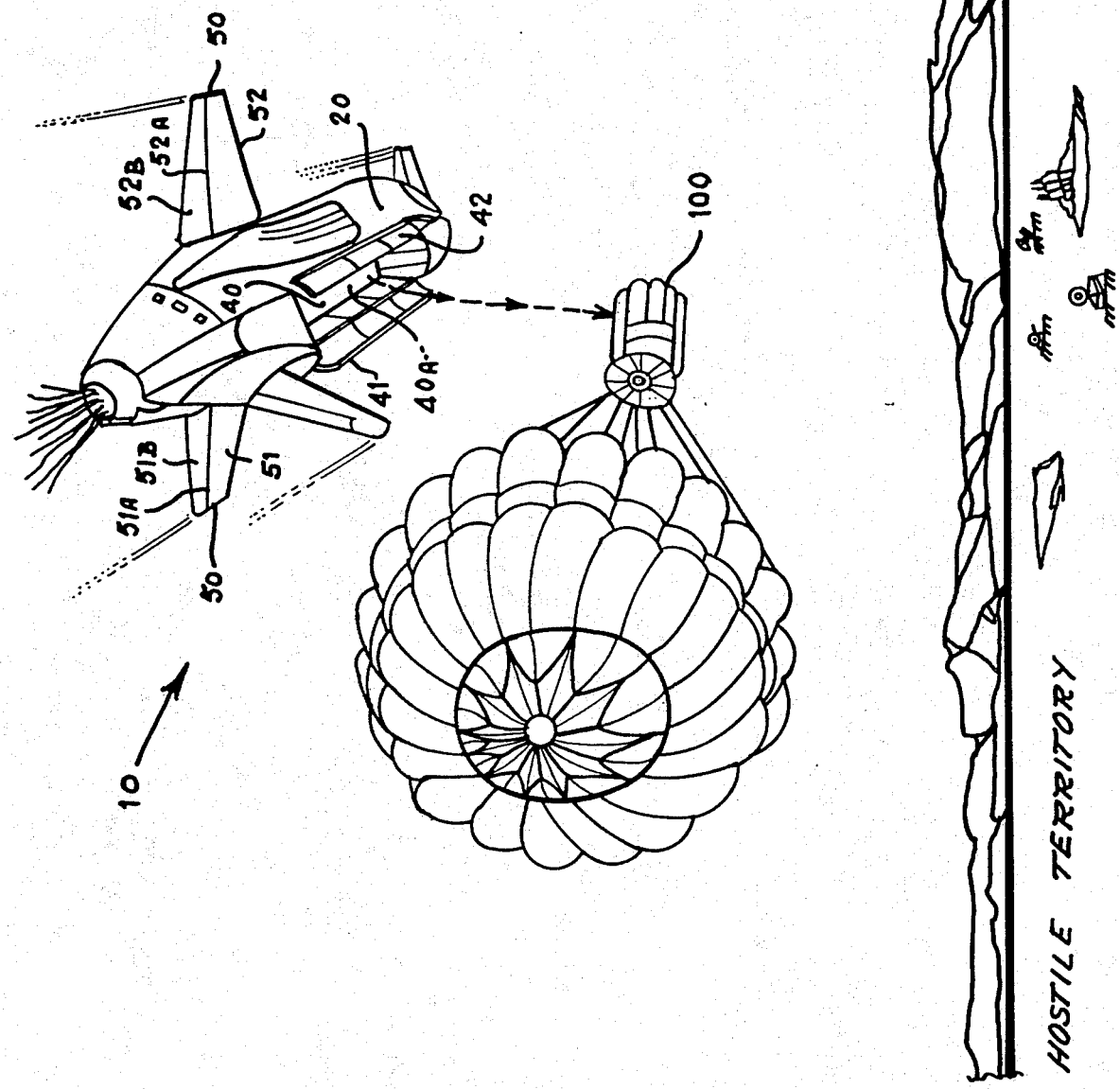

ated, and remotely, closeable by an inward move-

REMOTELY PILOTED VEHICLE

STATEMENT OF GOVERNMENT INTEREST

The invention described herein may be manufactured and used by or for the Government for governmental purposes without the payment of any royalty thereon.

BACKGROUND OF THE INVENTION

This invention relates to a remotely piloted vehicle (i.e., a pilotless robot aircraft that is controlled by remote means), hereinafter referred to as a "RPV".

A need has arisen in the art for a RPV that will achieve the following goals: is low in cost, is small, is light, is uncomplicated, is readily transportable, is easily maintained, is multi-mission effective, includes an internal weapons/payload bay, has unrestricted inverted flight capability, has a simple high lift system, has a low (i.e., small) radar cross section configuration, has excellent low altitude mission performance at a speed of $M=0.9$, is minimally vulnerable to a potential enemy in flight in its environment, and is recoverable.

We have invented such a unique RPV; and, thereby, we have significantly advanced the state-of-the-art.

SUMMARY OF THE INVENTION

This invention pertains to the aforementioned unique RPV; and, the principal object of this invention is to provide such a RPV by teaching the structure of a preferred embodiment of the inventive RPV.

This principal object, as well as other related objects, of this invention will become readily apparent after a consideration of the description of the invention, together with reference to the Figures of the drawings, in which the same reference numeral (and the like) refers to the same component (and the like).

DESCRIPTION OF THE DRAWINGS

FIG. 5 is a pictorial representation of the preferred embodiment shown in FIGS. 1, 3 and 4, while it is airborne in the inverted position, and is delivering a store over hostile territory.

DESCRIPTION OF THE PREFERRED EMBODIMENT

With reference to FIGS. 1 and 3-5, inclusive, therein is shown a preferred embodiment 10 of our inventive RPV.

Figure 1:
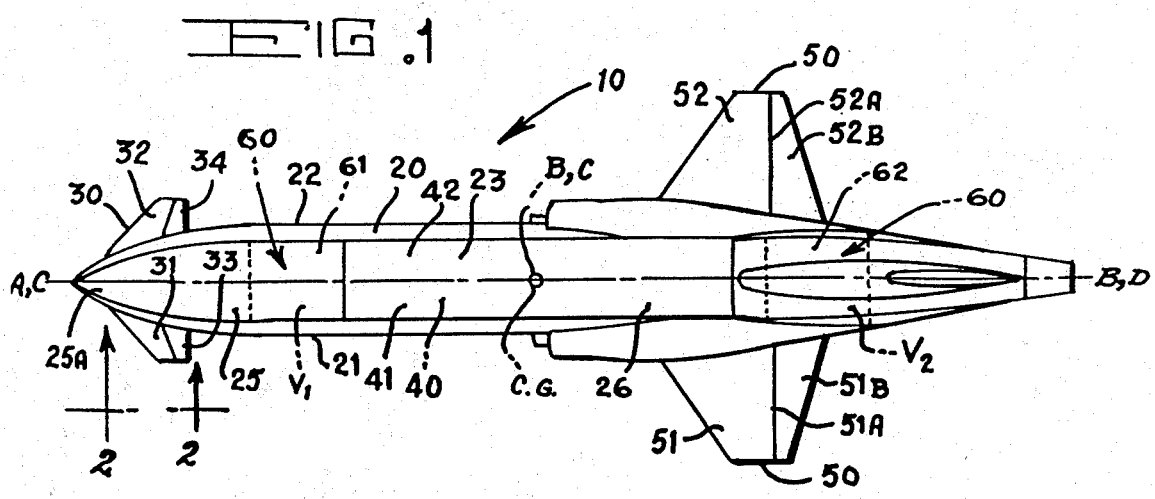
FIG. 1 is a top plan view, in simplified form, both pictorial and schematic, of a preferred embodiment of the invention RPV.
Figure 3:
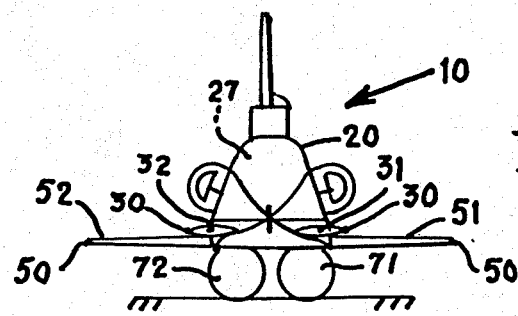
FIG. 3 is a front view, in simplified schematic and pictorial form, of the preferred embodiment shown in FIG. 1.
Figure 4:
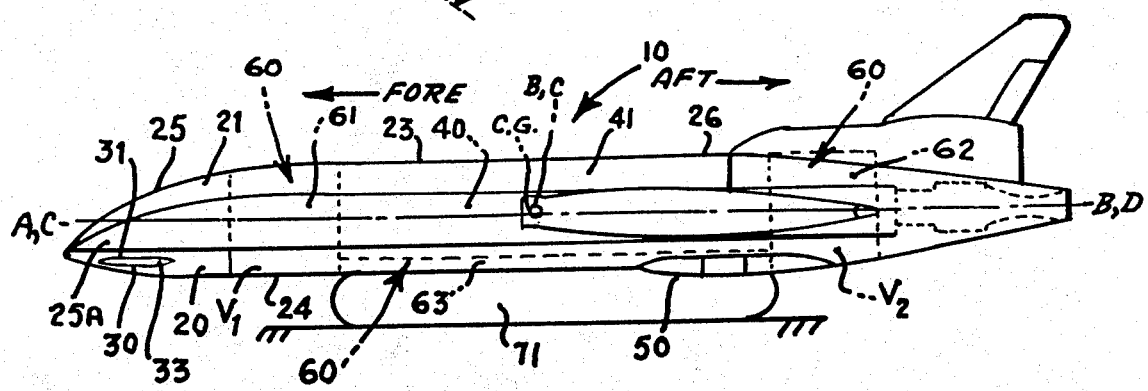
FIG. 4 is a side elevation view, in simplified schematic and pictorial form, of the preferred embodiment shown in FIGS. 1 and 3.

In the most basic and generic form, the RPV 10 has a center of gravity "C.G." and a longitudinal axis "A–B", and comprises: a fuselage 20 having a longitudinal axis "C–D" that is coincident with the longitudinal axis A–B of the RPV 10, a port side 21, a starboard side 22, an upper portion 23, a lower portion 24, a fore section 25 with a nose 25A, and an aft section 26, and with the fuselage 20 also having a transverse cross section, generally designated as 27, that is essentially constant in shape; a canard 30 comprising a first section 31 and a symmetrical second section 32, with each canard section 31 and 32 located essentially at, and connected to, the nose 25A of the fore section 25 of the fuselage 20, and with the first canard section 31 connected to the port side 21 of the fuselage 20, and with the second carnard section 32 connected to the starboard side 22 of the fuselage and oppositely disposed with relation to the first canard section 31; a weapons (and payload) bay 40 located at the center of gravity C.G. of the RPV 10 and internal of, and having an opening 40A (see FIG. 5) at the upper portion 23 of the fuselage 20, so that a store (e.g., bomb 100, FIG. 5) releasably held within the weapons/payload bay 40 can be delivered by, and selectively released from, the RPV 10 when the RPV is in flight and in an inverted position, as is shown in FIG. 5; a wing 50 comprising a first section 51 and a symmetrical second section 52, with each wing section having a trailing edge (i.e., trailing edge 51A for first wing section 51, and trailing edge 52A for second wing section 52), with an elevon thereat (i.e., elevon 51B at trailing edge 51A, and elevon 52B at trailing edge 52A), and with each wing section 51 and 52 simultaneously located at, and connected to, the aft section 23 of the fuselage 20 and also to the lower portion 24 of the fuselage 20, and also with the first wing section 51 simultaneously connected to the port side 21 of the fuselage 20, and also with the second wing section 52 simultaneously connected to the starboard side 22 of the fuselage 20; a fuel tankage, generally designated 60, disposed within the fuselage 20, with the tankage 60 also simultaneously disposed such that an equal volume (e.g., such as equal volumes V1 and V2) of the tankage is positioned both fore, and aft, of the center of gravity C.G. of the RPV 10 (such as is shown in FIGS. 1 and 4); and, a first inflatable landing skid 71 and a second inflatable landing skid 72 disposed at, and connected to, the lower portion 24 of the fuselage 20, in equal spaced-apart relationship, as is indicated in FIG. 3.

Figure 2:
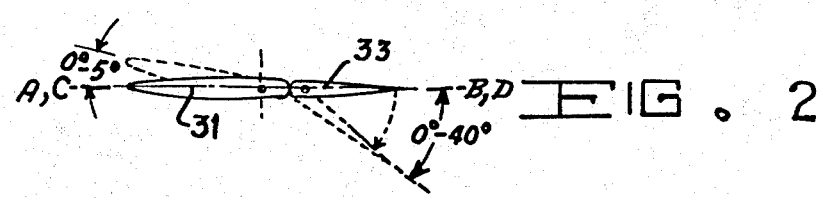
FIG. 2 is the view as seen along line 2—2 in FIG. 1, enlarged and in detail.

More specifically, the canard 30 includes a first canard elevator section 33 pictorially connected to the first canard section 31, and a second canard elevator section 34 pictorially connected to the second canard section 32. With reference to FIG. 2, therein is shown the first canard section 31 and the first canard elevator section 33, which respectively are representative of, and symmetrical to, second canard section 32 and second canard elevator section 34. It is to be noted: that the canard sections (e.g., first canard section 31) are movable from zero degrees to 5 degrees upwardly in relation to the coincident longitudinal axes A–B of RPV 10 and C–D of the fuselage 20; and, that the canard elevator sections (e.g., first elevator section 33) are movable pivotally downwardly from zero degrees to 40 degrees in relation to these same coincident longitudunal axes A–B and C–D. It is also to be noted: that first and second canard sections 31 and 32 are movable (and, in fact, are moved) simultaneously; and, that similarly first and second canard elevator sections 33 and 34 are movable (and, in fact, are moved) simultaneously.

Additionally, the weapons/payload bay 40, FIGS. 1, 4 and 5, includes two 41 and 42 identical, simultaneously openable, and simultaneously closeable doors. The doors 41 and 42 are sized to completely close the closeable opening 40A, FIG. 5, of the weapons/payload bay 40. The closeably opening 40A of the bay 40 is selectively, and remotely, closeable by an inward movement of the weapons bay doors 41 and 42, and likewise is selectively, and remotely, openable by an outward movement of the doors 41 and 42. Of course, for delivery of the store (such as bomb 100, FIG. 5, or any other payload in weapons/payload bay 40) the doors 41 and 42 are remotely actuated to the open (i.e., outward) position. Also, the weapons/payload bay 40 has a geometric center, designated "B.C."; and, the center of gravity C.G. of the RPV 10, FIGS. 1 and 4, is located at the geometric center B.C. of the bay 40.

Further, the fuel tankage 60, FIGS. 1 and 4, includes a first main fuel tank 61 and a second main fuel tank 62, with the first tank 61 disposed forward of the weapons bay 40, and with the second tank 62 disposed aft of the weapons bay 40. The fuel tankage 60 also includes a fuel bay 63, FIG. 4, under the weapons bay 40, and interconnecting, the forward main fuel tank 61 and the aft main fuel tank 62.

Also, the preferred embodiment 10 of the RPV has: a wing span of 8.06 feet; a length of 22.33 feet; a height of 6.25; and a weight of approximately 3300 pounds. In addition, the nose 25A of the fore section 25 of the fuselage 20 is made of fiberglass material; the fuselage 20, aft of the nose 25A, is made of aluminum, fiberglass laminate, and honeycomb material; the wing 50 is made of aluminum and of polyvinyl chloride foam core material; and, the inflatable landing skids 71 and 72 are made of inelastic nomex nylon webbing impregnated with polyurethane plastic.

MANNER OF OPERATION AND OF USE OF THE PREFERRED EMBODIMENT

The manner of operation and of use of the preferred embodiment 10 of our inventive RPV can be easily ascertained by any person of ordinary skill in the art from the foregoing description, coupled with reference to the Figures of the drawings.

For others, it is said in explanation: that a store (such as bomb 100, FIG. 5) is located into the second closeable opening 40A of the weapons/payload bay 40; that the doors 41 and 42 are closed by moving them inwardly, thereby also closing the closeable opening 40A; that the RPV 10 is made airborne (and, is sent into flight) by launching by suitable conventional means (not shown); and that the flight, the manuevers during the flight (including the inverting of the RPV and the dropping of the bomb on the target, e.g., "hostile territory", FIG. 5), and the return and landing of the RPV 10 are all controlled remotely by suitable conventional means (not shown). When the RPV 10 is at the appropriate position near and/or over the target, a "surface" type of target (e.g., the "hostile" territory", FIG. 5), the RPV 10 is inverted in flight; the weapons bay doors 41 and 42 are opened (i.e., moved outwardly); and, the store (e.g., the bomb 100) is dropped, so as to hit the target. Then the doors 41 and 42 are closed; the RPV 10 is uprighted; and it is directed back to its base, where it is landed and recovered. One should note that, in the landing approach, the first and second canard sections 31 and 32, FIG. 2, are deflected from zero degrees to 5 degrees, and the first and second canard elevator sections 33 and 34, FIG. 2, are deflected from 0 degrees to 40 degrees. One should also note that, as a result of these deflections, a longitudinal moment results; and, that the moment is trimmed by the elevons 51B and 52B (which combine the usual functions of aircraft elevators and ailerons) with a deflection of 30 degrees. The elevons 51B and 52B in this instance become, in essence, flaps.

Several seconds prior to landing, the landing skids 71 and 72 are activated (i.e., inflated), and the RPV 10 is landed on these skids, and is thereby recovered.

CONCLUSION

It is abundantly clear from all of the foregoing, and from the Figures of the drawings, that the stated principal object, as well as other related objects, of our invention have been achieved.

It is to be noted that, although there have been described the fundamental and unique features of our inventive RPV, as applied to a preferred embodiment 10, various other embodiments, variations, adaptations, substitutions, additions, omissions, and the like may occur to, and can be made by, those of ordinary skill in the art, without departing from the spirit of our invention.

What is claimed is:

1. A remotely piloted vehicle, having a center of gravity and a longitudinal axis, comprising:
   a. a fuselage having a longitudinal axis coincident with said longitudinal axis of said remotely piloted vehicle, a port side, a starboard side, an upper portion, a lower portion, a fore section with a nose, and an aft section, with said fuselage also having a transverse cross section that is essentially constant in shape;
   b. a canard comprising a first section and a symmetrical second section, with each said canard section located essentially at, and connected to, said nose of said fore section of said fuselage, and with said first canard section connected to said port side of said fuselage, and with said second canard section connected to said starboard side of said fuselage and oppositely disposed with relation to said first canard section, wherein said canard includes a first elevator section pivotally connected to said first canard section, and a symmetrical second elevator section pivotally connected to said second canard section; and wherein said first canard section and said second canard section are each simultaneously movable from zero degrees to 5 degrees upwardly in relation to said coincident longitudinal axes of said fuselage and of said remotely piloted vehicle, and wherein said first elevator section and second elevator section of said canard are each simultaneously pivotable downwardly from zero degrees to 40 degrees in relation to said coincident longitudinal axes of said fuselage and of said remotely piloted vehicle;
   c. a weapons bay located at said center of gravity of said remotely piloted vehicle and internal of, and having a closeable opening in, said upper portion of said fuselage, whereby a store releasably held within said weapons bay can be delivered by, and can be selectively released from, said remotely piloted vehicle when said vehicle is in flight in an inverted position, wherein said weapons bay includes two identical, simultaneously openable, and simultaneously closeable doors, wherein said doors are sized to completely close said opening of said weapons bay, whereby said closeable opening of said weapons bay is selectively, and remotely, closeable by an inward movement of said doors, and is openable by an outward movement of said doors; and wherein said weapons bay has a geometric center, and said center of gravity of said remotely piloted vehicle is located at said geometric center of said weapons bay;

d. a wing comprising a first section and a symmetrical second section, with each said wing section having a trailing edge with an elevon thereat, and with each said wing section simultaneously located at and connected to said aft section and said lower portion of said fuselage, and also with said first wing section simultaneously connected to said port side of said fuselage, and also with said second wing section simultaneously connected to said starboard side of said fuselage;

e. fuel tankage disposed within said fuselage, with said tankage also simultaneously disposed such that an equal volume of said tankage is positioned both fore, and aft, of said center of gravity of said remotely piloted vehicle, wherein said fuel tankage includes a first and a second main fuel tank, and wherein said first main fuel tank is disposed forward of said weapons bay, and also therein second main fuel tank is disposed aft of said weapons bay, and further wherein said fuel tankage further includes a fuel bay disposed under said weapons bay, and interconnecting, said first and said second main fuel tanks;

f. and, a first inflatable landing skid and a symmetrical second inflatable landing skid disposed at, and connected to, said lower portion of said fuselage, in equal spaced-apart relationship.

2. A remotely piloted vehicle, as set forth in claim 1, wherein:

a. said nose of said fore section of said fuselage is made of fiberglass material;

b. said fuselage, aft of said nose, is made of aluminum, fiberglass laminate, and honeycomb material;

c. said wing is made of aluminum and of polyvinyl chloride foam core material;

d. and, said inflatable landing skids are made of inelastic nomex nylon webbing impregnated with polyurethene plastic.

3. A remotely piloted vehicle, as set forth in claim 2, wherein said vehicle has a wing span of 8.06 feet, a length of 22.33 feet, and a height of 6.25 feet.

4. A remotely piloted vehicle, as set forth in claim 3, wherein said vehicle has a weight of approximately 3300 pounds.

* * * * *